(12) United States Patent
Bratt et al.

(10) Patent No.: US 7,599,354 B2
(45) Date of Patent: Oct. 6, 2009

(54) ARCHITECTURE AND METHOD FOR RAPID DEVELOPMENT AND IMPLEMENTATION OF VOICE OVER IP FEATURES

(75) Inventors: John Robert Bratt, Chicago, IL (US); Gary H. Yi, Arlington Heights, IL (US); David Chi-Wing Mak, Chicago, IL (US)

(73) Assignee: M5 Networks, Inc., New York, NY (US)

( * ) Notice: Subject to any disclaimer, the term of this patent is extended or adjusted under 35 U.S.C. 154(b) by 777 days.

(21) Appl. No.: 10/752,582

(22) Filed: Jan. 8, 2004

(65) Prior Publication Data

US 2005/0152336 A1  Jul. 14, 2005

(51) Int. Cl.
*H04L 12/66* (2006.01)
(52) U.S. Cl. .................. 370/352; 370/401; 370/466; 709/246
(58) Field of Classification Search .......... 370/466, 370/352
See application file for complete search history.

(56) References Cited

U.S. PATENT DOCUMENTS

| | | | |
|---|---|---|---|
| 6,047,061 | A | 4/2000 | Cornes et al. |
| 6,493,353 | B2 | 12/2002 | Kelly et al. |
| 6,678,735 | B1 * | 1/2004 | Orton et al. ............ 709/230 |
| 6,819,664 | B1 | 11/2004 | Jeong |
| 7,061,928 | B2 * | 6/2006 | Giroti et al. ............ 370/422 |
| 7,095,733 | B1 * | 8/2006 | Yarlagadda et al. ...... 370/352 |
| 7,209,473 | B1 * | 4/2007 | Mohaban et al. ........ 370/352 |
| 2001/0028654 | A1 * | 10/2001 | Anjum et al. ........... 370/401 |
| 2001/0046234 | A1 * | 11/2001 | Agrawal et al. ......... 370/402 |
| 2002/0191596 | A1 | 12/2002 | Moyano et al. |
| 2003/0177252 | A1 | 9/2003 | Krichevski et al. |
| 2004/0172464 | A1 | 9/2004 | Nag |
| 2004/0199642 | A1 * | 10/2004 | Tremblay et al. ........ 709/227 |

(Continued)

FOREIGN PATENT DOCUMENTS

KR    2002082339 A   * 10/2002

OTHER PUBLICATIONS

J. Rosenberg et al., "SIP: Session Initiation Protocol," Standards Track, Network Working Group, Jun. 2002, pp. 1-121.

(Continued)

*Primary Examiner*—Kwang B Yao
*Assistant Examiner*—Jeffrey M Rutkowski
(74) *Attorney, Agent, or Firm*—Volpe and Koenig, P.C.

(57) ABSTRACT

The present invention discloses a method, program product and system for facilitating efficient development and deployment of features in a voice over internet protocol telephony system comprising protocol specific equipment. The method and program product comprise: developing a feature for deployment in the telephony system using a developer protocol, the developer protocol being independent of any specific VoIP protocol, and performing communication protocol conversion between the developer protocol and a specific VoIP protocol used by the telephony system on feature-related messages in order to communicate with the protocol specific equipment. The system comprises: a feature performance layer for performing telephony features, the feature performance layer being independent of any specific VoIP protocol used by the protocol specific equipment, and a communication interface layer interfacing with the feature performance layer to provide communication protocol conversion between the feature performance layer and the protocol specific telephony equipment.

23 Claims, 4 Drawing Sheets

U.S. PATENT DOCUMENTS

2004/0210673 A1* 10/2004 Cruciani et al. ............. 709/246
2004/0260824 A1* 12/2004 Berard et al. ............... 709/230

OTHER PUBLICATIONS

M. Arango et al., "Media Gateway Control Protocol (MGCP) Version 1.0," Information—Network Working Group, Oct. 1999, pp. 1-99.

M. Handley et al., "SDP: Session Description Protocol," Standards Track, Network Working Group, Apr. 1998, pp. 1-42.

Liu et al, Voice over IP Signaling: H. 323 and Beyond, IEEE Communication Magazine, Oct. 2000, vol. 38, Issue : 10, pp. 142-148, see entire document.

* cited by examiner

ARCHITECTURE AND METHOD FOR RAPID DEVELOPMENT AND IMPLEMENTATION OF VOICE OVER IP FEATURES

BACKGROUND OF THE INVENTION

A. Field of the Invention

The present invention is directed to the field of VoIP telephony and specifically to the efficient development and implementation of enhanced VoIP features in telephony systems.

B. Background

Voice over Internet Protocol (VoIP) generally refers to the technology used today to provide both traditional and enhanced telephony features using a local or wide area network. There are currently competing protocols for communicating via VoIP. Some of the most relevant ones are: Session Initiation Protocol (SIP), Media Gateway Control Protocol (MGCP) and H.323. Not only are there multiple protocols, but the protocols themselves are changing and evolving. Even if one protocol becomes dominant and a de facto standard, it is expected that the embedded base of products using one of the other protocols will be sufficiently significant to require their being supported for some time.

Most commercial VoIP systems and providers and indeed all traditional telecommunications providers include some core telephony features such as call forwarding, call waiting, call transfer and call hold. Were it limited to these features, VoIP would not be as compelling for customers. One of the main attractions for using VoIP is the ability to use enhanced telephony applications and features such as voice mail, conference bridge, multi-ring, unified messaging, auto attendant, receptionist console, automatic call distribution, and system administration as well as the ability to develop custom applications.

For a company providing such features using VoIP, it is very important to be able to develop and implement them quickly and efficiently. The existence of multiple protocols and their dynamic nature as described above adds complexity to VoIP feature development and implementation. Some companies may offer an enhanced feature, but only to users whose equipment complies with a specific protocol. In these cases, the application developed to provide the feature is integrated and written to work with a specific IP protocol, such as SIP. If, later, the application needs to be revised or a new one needs to be added, the developer must write the application such that it can work with the specific IP protocol. Also, if the protocol itself changes over time, the application will likely need to be rewritten for the feature to work with the revised protocol. Indeed, all applications designed to work with a specific protocol would need to be revisited were the protocol to change. For customers using the same features but with equipment operating under different protocols, this requires the developer to know the different protocols.

SUMMARY OF THE INVENTION

Having identified the aforementioned problems in the existing methods of providing VoIP features, the inventors have developed the present invention. The present invention provides an architecture and method for developing and implementing VoIP features that avoids the drawbacks of existing systems as described above. It allows for a developer to implement or revise features quickly and without worrying that they will not work with the protocol used by the customer equipment, such as SIP, MGCP, etc. Further, when the protocols themselves change, use of the present invention makes it unnecessary for the developer to rewrite the feature applications. In addition, instead of having to know the various IP protocols in use by the different customers, under the present invention, the developer needs only to be familiar with the developer's own standard protocol.

The present invention, as described herein, provides a method of facilitating efficient development and deployment of features in a voice over internet protocol telephony system comprising protocol specific equipment. The method comprises: developing a feature for deployment in the telephony system using a developer protocol, the developer protocol being independent of any specific VoIP protocol, and performing communication protocol conversion between the developer protocol and a specific VoIP protocol used by the telephony system on feature-related messages in order to communicate with the protocol specific equipment.

The present invention also provides a system for facilitating efficient development and deployment of features in a voice over internet protocol telephony system comprising protocol specific equipment. Such a system comprises: a feature performance layer for performing telephony features, the feature performance layer being independent of any specific VoIP protocol used by the protocol specific equipment, and a communication interface layer interfacing with the feature performance layer to provide communication protocol conversion between the feature performance layer and the protocol specific telephony equipment.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION OF THE INVENTION

Figure 1:
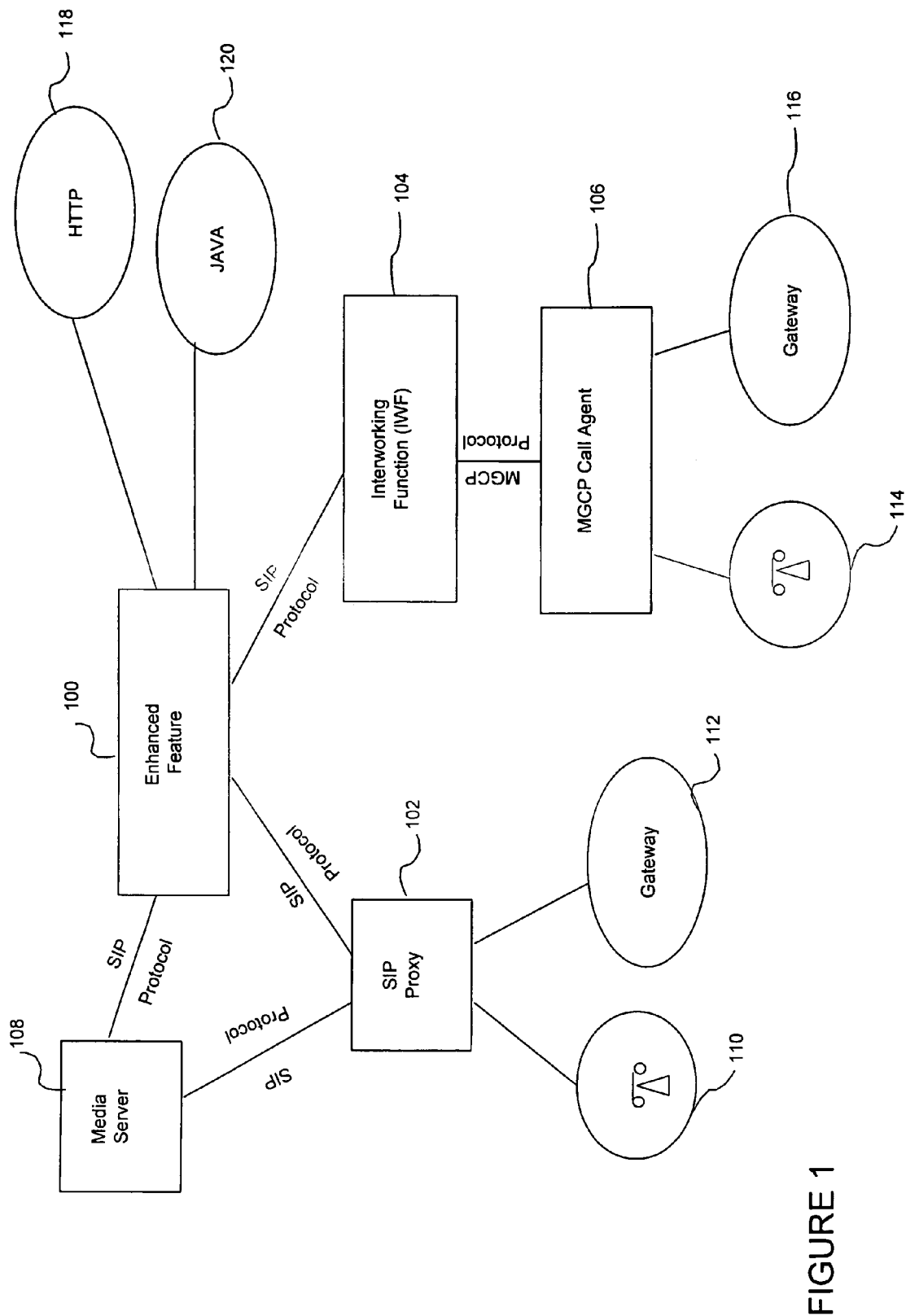
FIG. 1 illustrates the logical components of an existing VoIP system.

FIG. 1 illustrates the logical components of an existing VoIP system. Element 100 represents an enhanced VoIP feature application. In this figure, conferencing is used as an example of such an enhanced feature application. This application is connected to an SIP proxy 102 which in turn is connected to SIP protocol customer telephony devices such as an IP phone 110 and a gateway 112. A media server 108 provides the audio mixing functionality used with the conferencing application 100 and can communicate directly with the SIP proxy 102 and the application 100. The application can also be connected to an interworking function (IWF) 104 to allow it to communicate with an MGCP (Media Gateway Control Protocol) call agent 106 which in turn is connected to MGCP protocol customer devices such as IP phone 114 and a gateway 116 which facilitates the connection with the public switched telephone network (PSTN), not shown. Also, the application can provide information to the end-user and provide some call management functions via an HTTP server 118 or a Java application 120.

The connections between the application 100 and the SIP proxy 102 as well as the connection between the application and the IWF 104 and the media server 108 are all in SIP protocol in this example. The protocol is integrated with the application which must be able to speak and understand SIP protocol. It can work with MGCP protocol clients, but only through the use of the IWF 104. Thus, in existing systems such as the one shown in FIG. 1, the developer of the application 100 needs to write it so that it will work with SIP protocol. If the application needs to be revised, the developer would need to make it work with the protocols in which the application needed to communicate (e.g., SIP). And if the protocol changes in some way, the conferencing application and, indeed, all other applications would likely need to be rewritten. The features must then also be retested to ensure functionality.

In the conferencing example shown in FIG. 1, a separate media server 108 is used and that also needs to be able to communicate in and understand SIP protocol; the same problems as identified above are faced by the media server. The application 100 also needs to communicate in and understand Java 120 (e.g., a receptionist control program) as well as to be able to communicate with the HTTP (Hypertext Transport Protocol) server 118. Both Java and HTTP can be used for presenting information to the user. The SIP proxy and the MGCP call agents are the devices through which the PSTN or Internet are connected.

Figure 2:
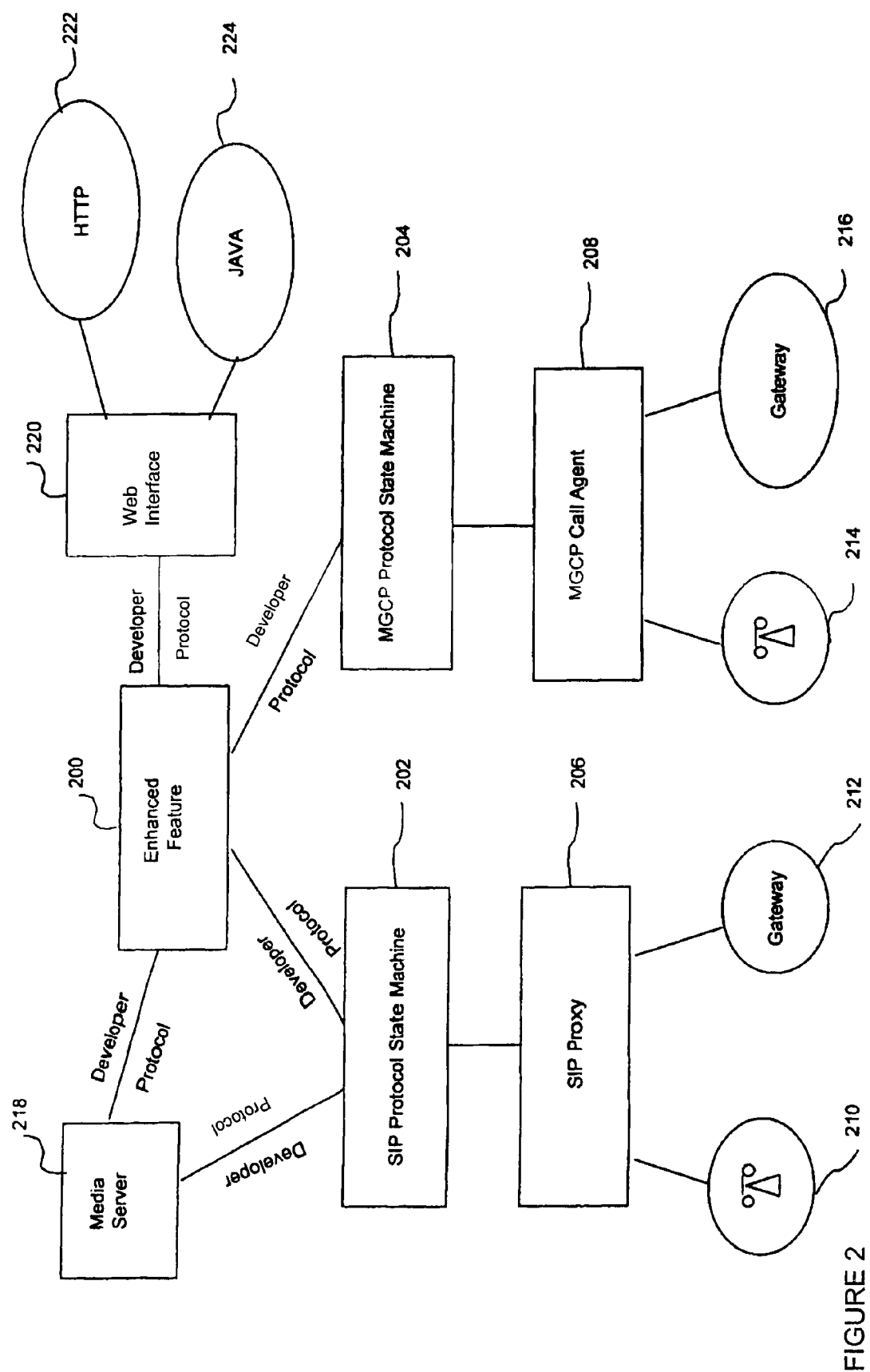
FIG. 2 illustrates the logical components of a VoIP system using a preferred embodiment of the present invention.

In contrast to FIG. 1, FIG. 2 illustrates the logical components of a VoIP system using a preferred embodiment of the present invention. Here the enhanced feature application 200 (e.g., conferencing) need only be able to communicate in and understand the developer's standard protocol (e.g., Catch-9 protocol). The SIP protocol state machine 202 handles translation of data between Catch-9 protocol and SIP protocol. The MGCP protocol state machine 204 handles translation of data between Catch-9 protocol and MGCP protocol. Other protocol state machines could be added as necessary. The protocol state machines 202 and 204 are connected to, respectively, SIP proxy 206 and MGCP call agent 208. SIP proxy 206 is in turn connected to SIP protocol customer telephony devices such as an IP phone 210 and a gateway 212. MGCP call agent 208 is in turn connected to MGCP protocol customer telephony devices such as an IP phone 214 and a gateway 216.

SIP proxy 206 and MGCP call agent 208 are similar in function to the SIP proxy 102 and the MGCP call agent 104 described above. In the present invention, however the application 200 does not need to know anything about the internet protocols used by the customer equipment. The use of the protocols state machines 202 and 204 facilitates this. Indeed, none of the communications between the application 200 and any of the attached logical elements need be in any standard internet protocol. The application 200 is not based on or impacted by the internet protocols of any customer devices. If there is a change/revision of a feature, the developer does not need to understand or know any IP protocols. Instead, the developer merely needs to revise the feature application. The protocol state machines will perform the translations necessary to ensure operability with the various protocols used by the devices. If there is a change to one of the protocols, in the present invention, only the corresponding protocol state machine needs to be revised. This is then effective for all feature applications without the feature applications themselves having to be rewritten.

The application 200, which in this example is shown as a conferencing application, uses a media server 218 in this example. The media server 218 provides the audio mixing necessary for the conferencing feature and communicates with the application 200 in the developer's standard protocol (e.g., Catch-9 protocol). Similarly, the application 200 communicates with a Web interface 220 in that developer's standard protocol. The Web interface allows the application to provide information to the end-user and provide some call management functions via an HTTP server 222 or a Java application 224.

To tie what is shown in FIG. 2 to a real world case, take, for example, the conference feature application. Assume that a customer has requested that the developer provide VoIP conferencing capability and that the customer uses a mix of SIP and MGCP protocol equipment. Under the architecture and method of the present invention, the developer can add a new feature, such as conferencing, to the customer's existing VoIP system without needing to know the specifics behind the IP protocols being used by the customer. Indeed, the developer can implement the conferencing application without even knowing what particular IP protocols are being used by the customer equipment, presuming that the system already includes the corresponding protocol state machine. The developer creates (or maybe has already created) the conferencing application and transmits it to the customer for updating the customer's server. No extensive testing is necessary to ensure that the feature will work with the devices since the feature does not contain any protocol specific coding. In this way, the feature is developed and implemented very quickly, much more quickly than can be done using existing systems. A similar example would be the revision or updating of features of an existing application. This also would be performed more quickly than in existing systems.

Another example addresses the change in a protocol itself. For example, suppose a customer's devices use a newer version of the SIP protocol. Instead of having to re-test and revise all existing feature applications to work with the newer version of the protocol, under the system of the present invention, the developer would merely need to address the protocol change in one location; i.e., the protocol state machine. By changing the protocol state machine corresponding to the protocol in question, the developer affects a change that will be effective for all feature applications.

Figure 3:
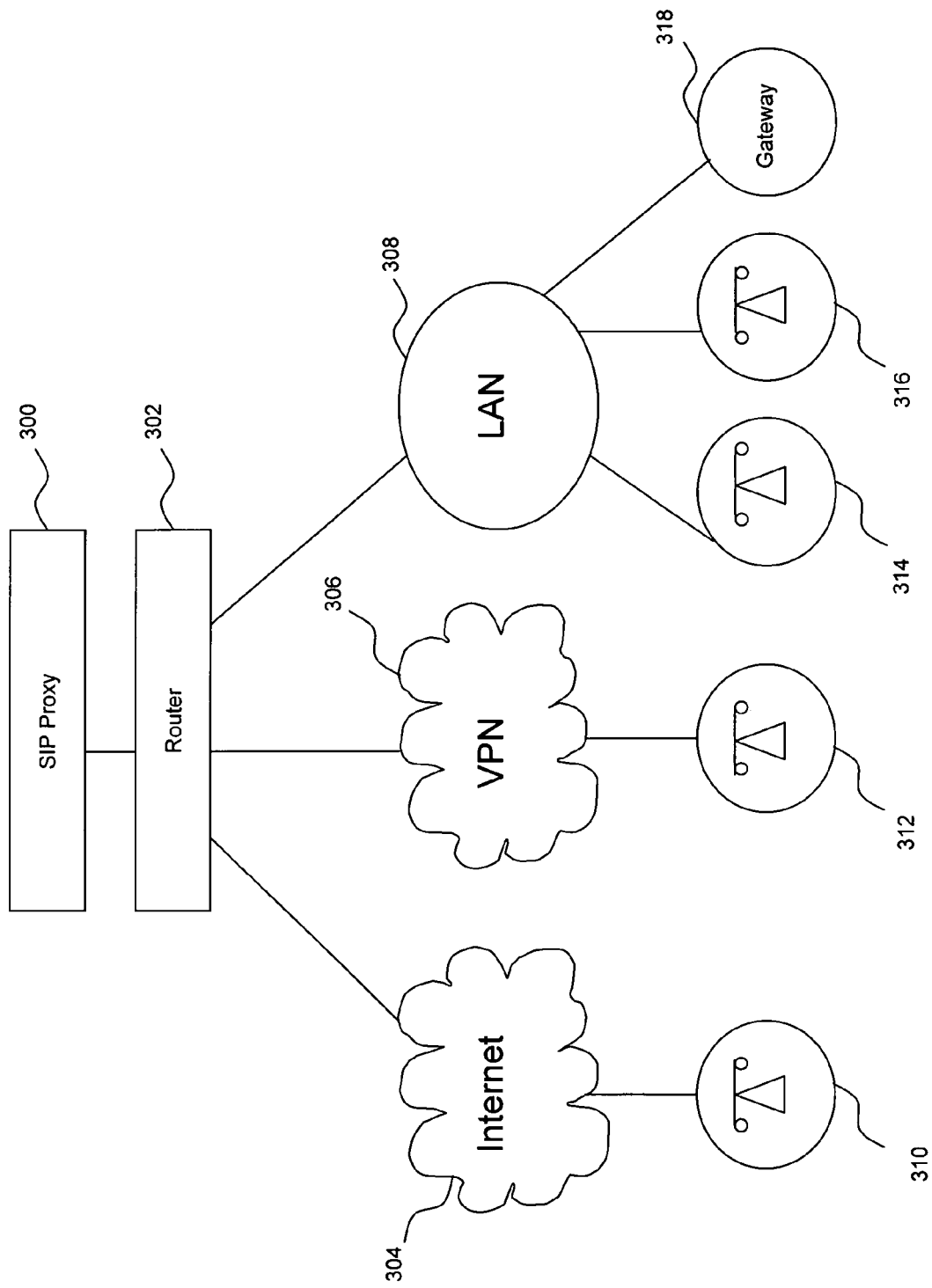
FIG. 3 illustrates the detailed connection between a SIP proxy and the various customer telephony devices.

In both FIGS. 1 and 2, the connection between the IP phones and gateways with the SIP proxies and MGCP call agents is shown in abbreviated form. A more detailed illustration of the connections is shown in FIG. 3. This figure shows a SIP proxy 300 as an example but applies equally to an MGCP call agent. The SIP proxy 300 is connected to a router 302 which directs the flow of data between the SIP proxy and the customer devices. The router is preferably connected to the various communication networks over which communication with the customer devices will occur. These networks include the Internet 304, a virtual private network (VPN) 306 and a local area network (LAN) 308. These networks are in turn connected to customer devices such as IP phones 310, 312, 314 and 316, as well as a gateway 318.

Figure 4:
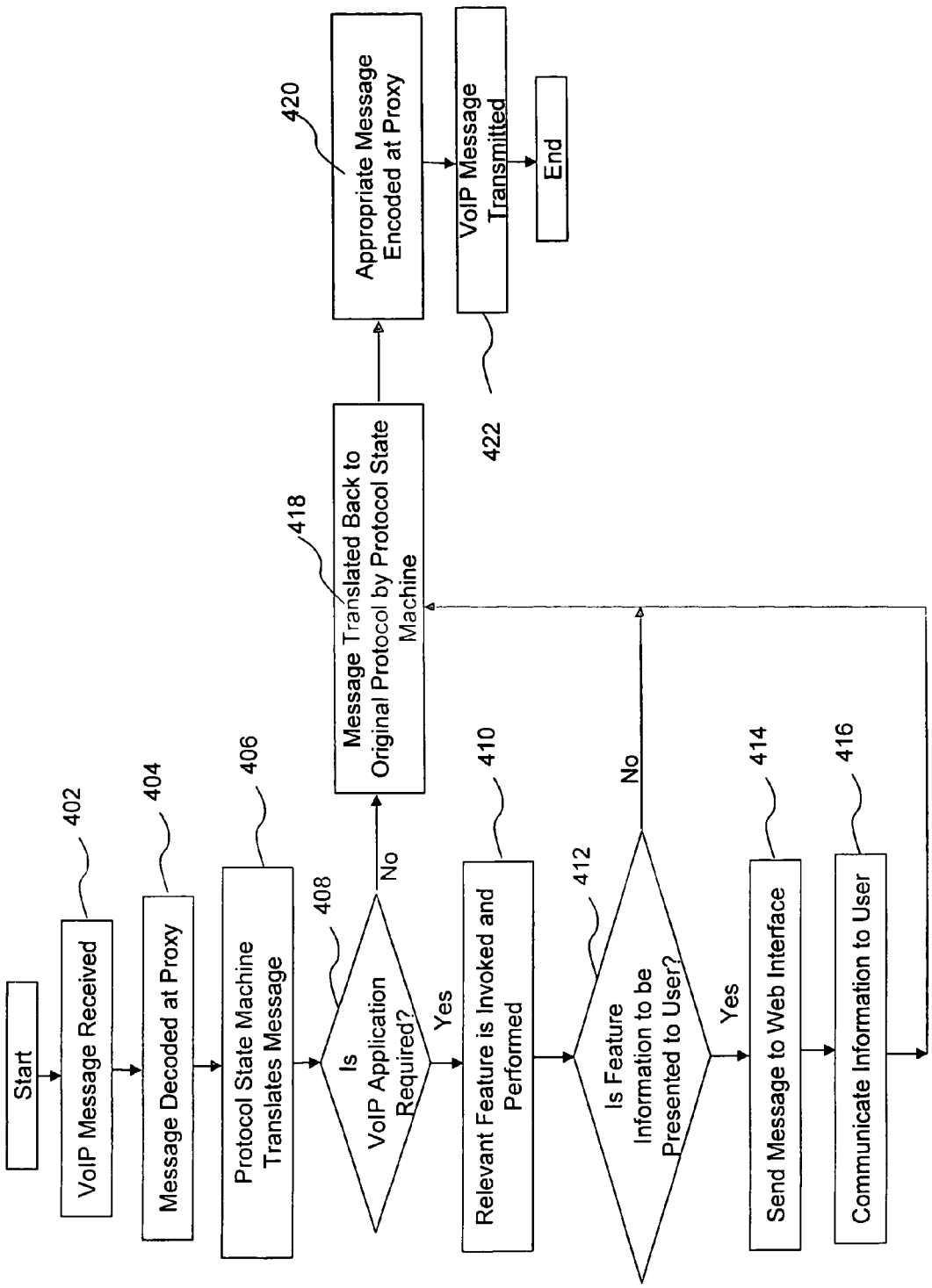
FIG. 4 is a flowchart illustrating basic call processing under the present invention.

FIG. 4 is a flowchart illustrating basic call processing under the present invention. In step 402, a VoIP message is received by the system at, for example, the SIP proxy or the MGCP call agent, perhaps through a router. In step 404, the message is parsed and decoded, preferably at the SIP proxy or MGCP call agent—the step retrieves relevant data from the VoIP message. Then, in step 406, the relevant protocol state machine translates the message to the developer's protocol (e.g., Catch-9 protocol). Next, in step 408, a core call processing component analyzes the message and determines whether a VoIP feature is required. In the preferred embodiment of the invention, the function of this call processing component is performed by the customer server equipment. If no VoIP features are determined to be required, the process proceeds to step 418; this is the case, for example, for a "normal" telephone call not requiring any special features. If it is determined that a VoIP feature is required to be performed, the call processing proceeds to step 410. In step 410, the relevant feature is invoked and performed. Such features, include, for example, call forwarding, call waiting and conferencing. Steps 412-416 illustrate an optional process. That is, in step 412, the system determines whether feature information needs to be presented to the user. Such information includes, for example, a display listing the other parties connect to a conference call. If such feature information is not to be provided to the user, the process proceeds to step 418. If it is to be provided, the relevant message is sent to the web interface in step 414. Then, in step 416, the web interface uses Java or HTTP to communicate the information to the user. The call processing then proceeds to step 418. Note that a call could also come in through the Java or HTTP server via the web interface. For example, the person running a relevant Java application can monitor, join, or disconnect someone else from a conference. The processing of such actions do not need to go through protocol conversion.

In step 418, the internal developer's protocol message is returned to the protocol state machine for conversion back to the protocol from which it originated. In step 420, in the relevant proxy, the appropriate protocol message is constructed. In step 422, the call processing concludes with the transmission of the VoIP message, in the correct protocol, to the final destination (via the proxy and router if applicable).

In the preferred embodiment, customer server equipment runs the features and controls the interaction with the users. In this embodiment, when the customer requests or requires a new feature to be added or a feature to be updated, the developer sends the customer a revised program to update or replace that which is currently run on the customer server. In an alternate embodiment, everything except for the phone and gateways is run on the developer's server or on some central servers. The features are then strictly controlled and can be updated frequently without needing to update programming in customer servers.

One of the features of the present invention that allows for the benefits described above is the use of protocol state machines to convert from a developer's protocol to one or more VoIP protocols. As mentioned above, this allows for a developer to implement or revise features quickly and without worrying that they will not work with the protocol used by the customer equipment. Further, when the protocols themselves change, having used the present invention prevents the developer from having to rewrite the feature applications. The protocol state machines are merely modified, and the change is then effective for all features. These protocol state machines are shown, in FIG. 2, as elements 202 and 204.

Most VoIP features can be implemented using various combinations of nine types of messages. The protocol state machine therefore, must be able to translate these nine types of messages between a developer's protocol and a standard VoIP protocol. Table 1 illustrates the correspondence between these nine types of messages under the developer's protocol and those under the two major standard VoIP protocols, SIP and MGCP. It also shows the minor differences in the correspondence depending upon whether the message is incoming or outgoing with respect to the customer system. It will be apparent to one skilled in the art that other correspondence tables could be constructed and used under the present invention. The scope of the present invention is not limited by the particular correspondence illustrated in the table below. Indeed, should a VoIP protocol change over time, the correspondence table may need to be revised.

TABLE 1

Correspondence Table

| Developer Protocol | SIP Protocol | | MGCP Protocol | |
|---|---|---|---|---|
| | Incoming | Outgoing | Incoming | Outgoing |
| Forward Call Setup | INVITE Method | INVITE Method | Originator Offhook + Originator Digits + Originator Create Connection Response | Terminator Ringing + Terminator Create Connection Request |
| Backward Call Setup | INVITE Response | INVITE Response | Terminator Ringing Response, or Terminator Offhook, or Terminator Create Connection Response | Terminator Create Connection Response |
| Connect Acknowledgement | ACK Method | ACK Method | Originator Modify Connection Response | Not Applicable |
| Release | BYE Method, or CANCEL Method | BYE Method, or CANCEL Method | Onhook or Delete Connection | Delete Connection |
| Transfer Request | REFER Method | REFER Method | XML Event | XML Event |
| Transfer Response | REFER Response | REFER Method | Not Applicable | Ignored |
| New Media Request | re-INVITE Method | re-INVITE Method | Modify Connection | Modify Connection |
| New Media Response | re-INVITE Response | re-INVITE Response | Modify Connection Response | Modify Connection Response |
| Info Message | Other message not affecting call logic | Transmit message contents | Other message not affecting call logic | Transmit message contents |

Tables 2 and 3 below show basic message overviews of SIP and MGCP respectively and provide descriptions of the terms and types of messages found in Table 1. The SIP protocol is defined in RFC3261. Further details of the SIP protocol can be found at: http://www.jetf.org/rfc/rfc3261.txt?number=3261.

TABLE 2

SIP Messages

| SIP Message | Purpose |
| --- | --- |
| INVITE Method | Initiates a phone call/session. Contains information about the originating party and the called address. |
| INVITE Response | Indicates information about the terminating call party. Values include Trying, Ringing and Connect. |
| ACK Method | Indicates the originating party's acceptance of the call/session. |
| BYE Method | Indicates the desire to end a call/session. Can be initiated by either party. |
| CANCEL Method | Indicates the originating party's desire to end a call/session prior to the call being answered by the terminating party. |
| REFER Method | Indicates the desire to transfer the call/session to a third party. Contains the transfer address. Can be initiated by either the call originator or terminator. |
| re-INVITE Method | Indicates a desire to change the media attributes of the call/session |

The MGCP protocol is defined in RFC2705. The complete details of this protocol can be found at: http://www.jetf.org/rfc/rfc2705.txt?number=2705.

TABLE 3

MGCP Messages

| MGCP Message | Purpose |
| --- | --- |
| Offhook | The call originator or terminator has lifted the receiver |
| Onhook | The call originator or terminator has replaced the receiver |
| Digits | The number dialed by the call originator |
| Ringing | Request to cause the terminating phone to ring |
| Ringback | Request to cause the originator to hear ringing in the receiver |
| Create Connection | Request to cause a media connection to be created |
| Modify Connection | Request to alter an existing media connection |
| Delete Connection | Request to delete an existing media connection |
| XML Event | Indicate interaction with a display element of a phone |

In the case of both the SIC and also the MGCP protocols, the protocol messages may include, as a subpart or attachment, a message formulated in a separate SDP (Session Deescription Protocol) protocol. Media Information about a VoIP phone call (IP addresses, port addresses, and such things as the encryption protocol) are conveyed via this included Session Description Protocol (SDP) message. The SDP protocol is defined in RFC2327, http://www.jetf.org/rfc/rfc2327.txt?number=2327. The major components of the SDP are: "Codecs supported" i.e., what type of compression is to be used on the call; IP Address, i.e., at what IP address the phone/endpoint is listening for and also sending back audio; and "Port" i.e., which port number at that IP address serves as the phone/endpoint port and is listening for and also sending back audio. "Voice transport information" is one type of media information.

In the preferred embodiment, the developer protocol message types are defined as follows. Other types and other definitions could also be used under the present invention.

The Forward Call Setup message is used to initiate a new call. In addition to the call address information, it contains the originator's voice transport information. This message is defined in Table 4.

TABLE 4

Forward Call Setup

| | |
| --- | --- |
| Calling Address | Character String |
| Calling Subscriber | Integer |
| Called Address | Character String |
| Called Subscriber | Integer |
| Diverting Address | Character String |
| Diverting Subscriber | Integer |
| Conference Bridge | Character String |
| Transport Host | Character String |
| Transport Port | Integer |
| Transport Codecs | Character String |

The Backward Call Setup message is a successful acknowledgement to a new call initiation. In typical call processing, multiple Backward Call Setup messages are received—when the terminator accepts the call, when the terminator starts ringing, and when the terminator answers the call. In addition to the call address information, it contains the terminator's voice transport information. This message is defined in Table 5.

TABLE 5

Backward Call Setup

| | |
| --- | --- |
| Type | Proceeding, or Ringing, or Connect |
| Connected Address | Character String |
| Connected Subscriber | Integer |
| Reason | Character String |
| Cause | Integer |
| Diverting Address | Character String |
| Diverting Subscriber | Integer |
| Conference Bridge | Character String |
| Transport Host | Character String |
| Transport Port | Integer |
| Transport Codecs | Character String |

The Connect Acknowledgement message indicates the originator's acceptance of the call. It can optionally contain the originator's modified voice transport information. This message is defined in Table 6.

TABLE 6

Connect Acknowledgement

| | |
| --- | --- |
| Reason | Integer |
| Transport Host | Character String |
| Transport Port | Integer |
| Transport Codecs | Character String |

The Release message indicates the termination of a call. It can be transmitted/received by either the call originator or terminator. This message is defined in Table 7.

TABLE 7

Release

| | |
| --- | --- |
| Reason | Integer |
| Cause | Character String |

The Transfer Request message is used to replace one party of the call. The Transfer Response message is used to accept or deny a transfer request. The message is defined in Table 8.

TABLE 8

Transfer Request

| | |
|---|---|
| Transfer To Address | Character String |
| Transfer To Subscriber | Integer |
| Transfer From Address | Character String |
| Transfer From Subscriber | Integer |
| Transport Host | Character String |
| Transport Port | Integer |

The Transfer Response message is used to accept or deny a transfer request. The message is defined in Table 9.

TABLE 9

Transfer Response

| | |
|---|---|
| Reason | Integer |
| Cause | Character String |
| Transport Host | Character String |
| Transport Port | Integer |

The New Media Request message is used to change the voice transport information for the call. It can be transmitted/received by either the call originator or terminator. It can optionally contain voice transport information. It is used for numerous features including Music on Hold, Multi-Party Conference, and Call Center whisper. This message is defined in Table 10.

TABLE 10

New Media Request

| | |
|---|---|
| Connected Address | Character String |
| Connected Subscriber | Integer |
| Transport Host | Character String |
| Transport Port | Integer |
| Transport Codecs | Character String |

The New Media Response message is used to accept or deny a new media request. It can optionally contain voice transport information. This message is defined in Table 11.

TABLE 11

New Media Response

| | |
|---|---|
| Connected Address | Character String |
| Connected Subscriber | Integer |
| Transport Host | Character String |
| Transport Port | Integer |
| Transport Codecs | Character String |
| Reason | Integer |
| Cause | Character String |

The protocol state machines, using correspondences as defined above, or other correspondences as appropriate, convert messages from developer protocol to a specific VoIP protocol and vice-versa. These conversion are performed in customer server equipment in the preferred embodiment. In an alternate embodiment, such conversions take place at a developer or third-party server computer.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A method of facilitating efficient development and deployment of additional features for voice over internet protocol (VoIP) telephony system comprising protocol specific equipment, said method comprising:
    developing, in addition to existing services for use by the (VoIP) telephony system, a new feature for deployment in the VoIP telephony system using an arbitrary developer protocol, said developer protocol being independent of any specific VoIP protocol, including said VoIP telephony system;
    performing communication protocol conversion between said developer protocol used to develop said feature and a specific VoIP protocol used by the telephony system responsive to feature-related messages requesting said feature in order to communicate with the protocol specific equipment; and
    performing communication protocol conversion employing a single interface layer between said developer protocol of at least one of said existing services, which is also in said developer protocol, and said specific VoIP protocol responsive to a messages requesting said at least one of said existing services in order to communicate with the protocol specific equipment.

2. A method according to claim 1 wherein said method further comprises preparing a revision to said feature independently of any specific VoIP protocol.

3. A method according to claim 1 wherein said method further comprises revising said communication protocol conversion based on changes to at least one of said developer protocol and said specific VoIP used by the telephony system.

4. The method according to claim 1 wherein, providing said existing services includes providing media services.

5. The method according to claim 4 wherein, said media services are provided to support said feature.

6. The method of claim 1, further comprising said one of said existing services communicating directly with said feature in said arbitrary developer protocol.

7. A machine readable program code for facilitating efficient development and deployment of additional features in a voice over internet protocol (VoIP) telephony system comprising protocol specific equipment, said machine readable program code, when executed, performing the following method steps, comprising:
    a) performing telephony features, employing an arbitrary protocol independent of any specific VoIP protocol used by said protocol specific equipment;
    b) providing services in addition the services performed at step a), employing said arbitrary protocol;
    c) providing communication protocol conversion between the arbitrary protocol performed at step a) and said VoIP protocol specific telephony equipment responsive to a feature request; and
    d) providing communication protocol conversion between the arbitrary protocol at step b) and said VoIP protocol specific telephony equipment employing a single interface layer responsive to a service request 8. A method according to claim 7 wherein said step a) enables features performed by step a) to be revised without inclusion of any commands unique to any specific VoIP protocol used by said protocol specific equipment.

9. A method according to claim 7 wherein said step d) allows for revisions to said protocol conversion based on changes to at least one of said arbitrary protocol and said VoIP protocol.

10. A method according to claim 7 wherein steps a) to d) are programmed into a server located at a customer site.

11. A method according to claim 7 wherein steps a) to d) are programmed into a server located at a developer site.

12. A program product facilitating efficient development and deployment of new features, in addition to existing services provided for a voice over internet protocol (VoIP) telephony system comprising protocol specific equipment, said program product comprising machine-readable program code for causing, when executed, one or more machines to perform the following method steps, comprising:
    performing telephony features, said features using an arbitrary developer protocol which is independent of any specific VoIP protocol used by said protocol specific equipment;
    performing communication protocol conversion between said developer protocol and a specific VoIP protocol used by the telephony system responsive to feature-related message requests to communicate with the protocol specific equipment supporting VoIP;
    performing communication protocol conversion of one of said existing services, which also use the developer's protocol, using a single interface layer between said developer protocol and said specific VoIP protocol to communicate with the protocol specific equipment supporting VoIP.

13. A program product according to claim 12 wherein said method steps further comprise a step of preparing a revision to said feature independently of any specific VoIP protocol.

14. A program product according to claim 12 wherein said method steps further comprise a step of revising said communication protocol conversion based on changes to at least one of said developer protocol and said specific VoIP protocol used by the telephony system.

15. A system for providing voice over internet (VoIP) telephony, said system comprising:
    a device for performing an enhanced telephony feature using an arbitrary developer protocol, said developer protocol being independent of any specific VoIP protocol;
    a device for providing other services configured to use the arbitrary protocol;

a protocol state machine employing a single layer for converting messages between said developer protocol and a specific VoIP protocol used by protocol specific telephony equipment in the system responsive to a request for said feature;

said protocol state machine for converting messages between said developer protocol and said specific VoIP protocol responsive to a request for one of said services; and a proxy for communicating messages in said specific VoIP protocol between said protocol state machine and said protocol specific equipment supporting VoIP.

16. A method for integrating a feature into a voice over internet protocol (VoIP) telephony system supporting a given protocol, comprising:

incorporating said feature into the VoIP telephony system employing an arbitrary developer's protocol which is independent of said given protocol;

employing said arbitrary protocol to provide services in addition to said feature;

employing a single layer for decoding a VoIP message in said given protocol from a subscriber to the system;

translating said message in said given protocol to said developer's protocol;

determining if said message requests said feature;

invoking said feature;

translating said feature in said developer's protocol to said given protocol; and sending the feature to said subscriber; and decoding a VoIP message in said given protocol from a subscriber to the system;

translating said message in said given protocol to said developer's protocol; determining if said message requests one of said services; and invoking the requested service;

translating said service in said developer's protocol to said given protocol; and sending the service to said subscriber.

17. The method of claim 16, wherein the decoding step further comprises:

employing a proxy for decoding the message from the subscriber.

18. The method of claim 17, the sending step further comprises:

encoding the translated feature employing said proxy preparatory to sending the message to the subscriber.

19. Apparatus for integrating a feature into a voice over internet protocol (VoIP) telephony system supporting a given protocol, comprising:

a first device incorporating said feature into the VoIP telephony system configured to employ an arbitrary developer's protocol which is independent of said given protocol;

a second device employing said arbitrary protocol to provide services in addition to said feature;

a decoding device for decoding a VoIP message in said given protocol from a subscriber to the system;

a first translator for translating said message in said given protocol to said developer's protocol;

a third device for determining if said message requests said feature;

a fourth device for invoking said feature;

a second translator for translating said message in said developer's protocol to said given protocol when the message does not request said feature; and a sending device sending the feature to said subscriber; and wherein, when said message requests one of said services, said first translator translates said message in said given protocol to said developer's protocol and said third device determines that said message requests one of said services;

said fourth device invokes said one of said services;

said second translator translates said one of said services in said developer's protocol to said given protocol; and said sending device sends said one of said services to said subscriber.

20. The apparatus of claim 19, further comprising:

a proxy for decoding the message from the subscriber.

21. The apparatus of claim 20, the sending device further comprises:

an encoder for encoding the translated feature employing said proxy preparatory to sending the message to the subscriber.

22. Apparatus for integrating a new feature as well as existing services for use in first and second voice over internet protocol (VoIP) telephony systems each having operating protocols which are different from one another, comprising:

a service unit, comprising:

a first device incorporating said feature for use in the first and second VoIP telephony systems and being configured to employ an arbitrary developer's protocol for said feature, the arbitrary developer's protocol being independent of the protocols of said first and second VoIP telephony systems; and second and third server devices each employing said arbitrary protocol to respectively provide said existing services to said first and second VoIP telephony systems in addition to said feature;

said first VoIP telephony system further comprising a proxy for communicating subscribers messages to said first VoIP telephony system;

a first translator for translating said message in the protocol employed in said first VoIP telephony system to said developer's protocol for use by both said first and second devices;

said second VoIP telephony system further comprising a call agent for communicating subscribers messages from said second VoIP telephony system to said first device; and a second translator for translating said message in the protocol employed in said second VoIP telephony system to said developer's protocol for use by said first device to obtain said feature as well as said existing services.

23. The apparatus of claim 22 wherein said proxy is an SIP proxy and said call agent is an MGCP call agent.

* * * * *

UNITED STATES PATENT AND TRADEMARK OFFICE
CERTIFICATE OF CORRECTION

PATENT NO. : 7,599,354 B2  Page 1 of 1
APPLICATION NO. : 10/752582
DATED : October 6, 2009
INVENTOR(S) : Bratt et al.

It is certified that error appears in the above-identified patent and that said Letters Patent is hereby corrected as shown below:

IN THE SPECIFICATION

At column 12, line 7, after the words "in addition", insert --to--.

At column 12, line 16, after the words "service request", insert --.--.

Signed and Sealed this

Nineteenth Day of January, 2010

David J. Kappos
*Director of the United States Patent and Trademark Office*